United States Patent [19]
Radin et al.

[11] 3,748,642
[45] July 24, 1973

[54] EXTERNAL HIGH SPEED WARNING SYSTEM FOR AN AUTOMOTIVE VEHICLE

[75] Inventors: Bernard G. Radin, Oak Park; Lawrence J. Vanderberg, Ann Arbor, both of Mich.

[73] Assignee: Ford Motor Company, Dearborn, Mich.

[22] Filed: May 2, 1972

[21] Appl. No.: 259,094

Related U.S. Application Data

[63] Continuation of Ser. No. 103,212, Dec. 31, 1970, abandoned.

[52] U.S. Cl. .................................. 340/62, 340/263
[51] Int. Cl. .............................................. B60q 1/54
[58] Field of Search ....................... 340/62, 53, 263

[56] References Cited
UNITED STATES PATENTS

3,008,121  11/1961  Ellithorpe ............................ 340/62
3,310,774  3/1967  Marian ................................. 340/62

Primary Examiner—Alvin H. Waring
Attorney—John R. Faulkner and Keith L. Zerschling et al.

[57] ABSTRACT

An external high speed warning system for an automotive vehicle in which the normal turn signals of the vehicle are all energized intermittently when the speed of the automotive vehicle exceeds a predetermined limit. A speed responsive switch means is provided which energizes all four of the turn signal lamps from a source of electrical energy through a flashing switch when the predetermined speed limit has been reached. This speed limit may be in the range of 80 to 90 miles per hour. An audible warning means may also be provided which is energized when this predetermined speed limit has been reached.

3 Claims, 5 Drawing Figures

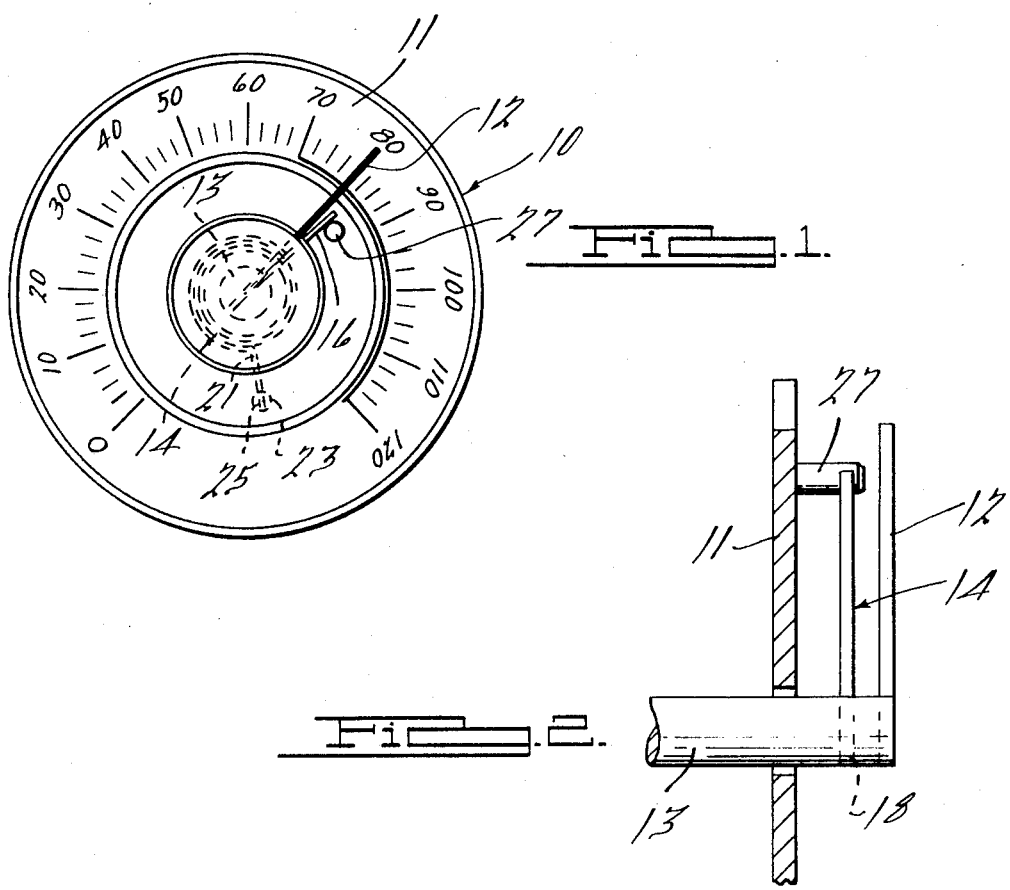
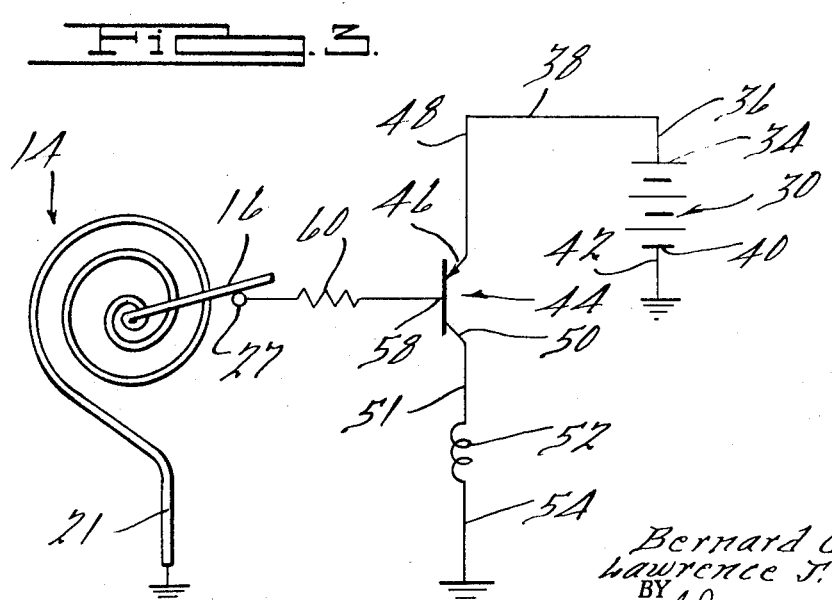

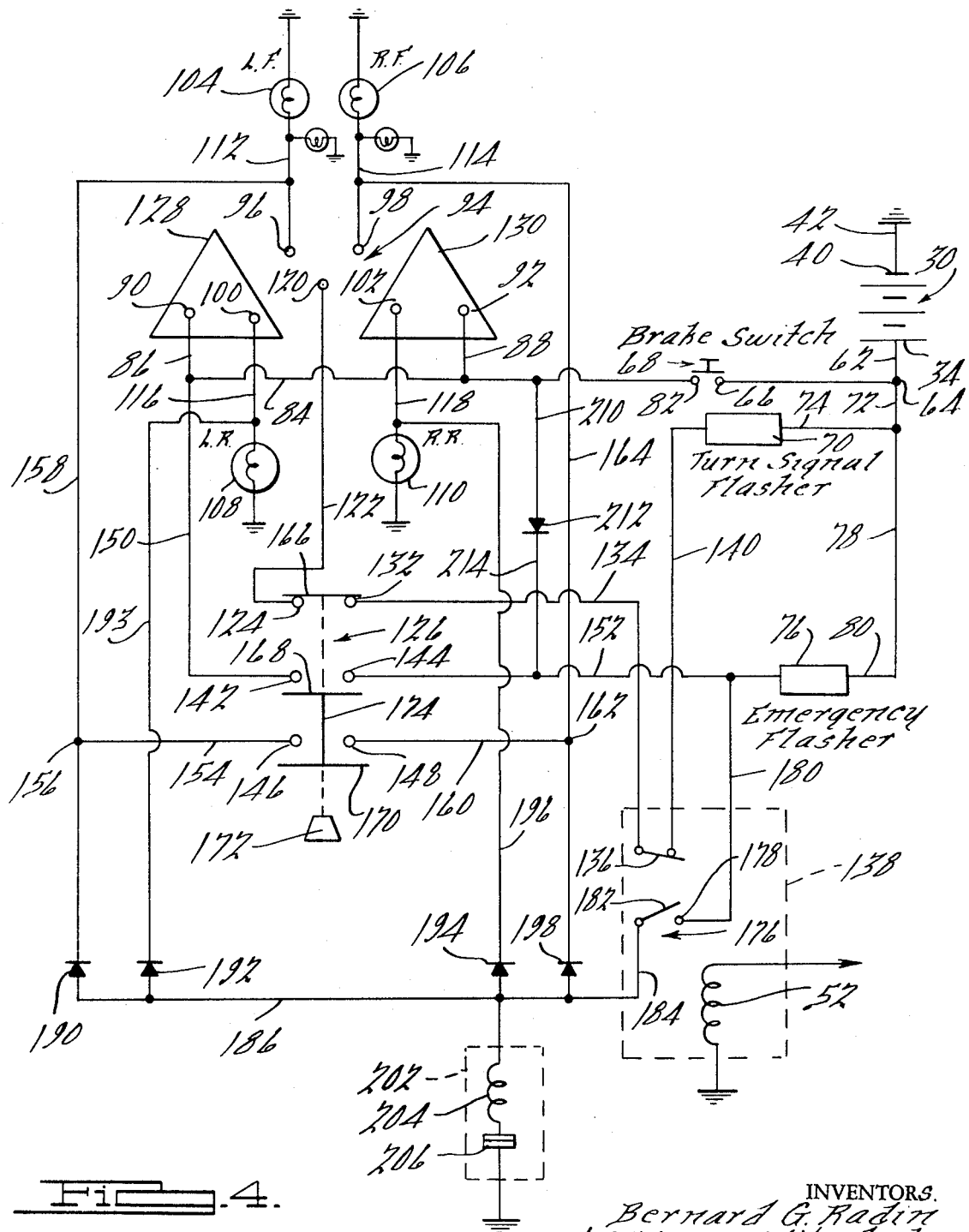

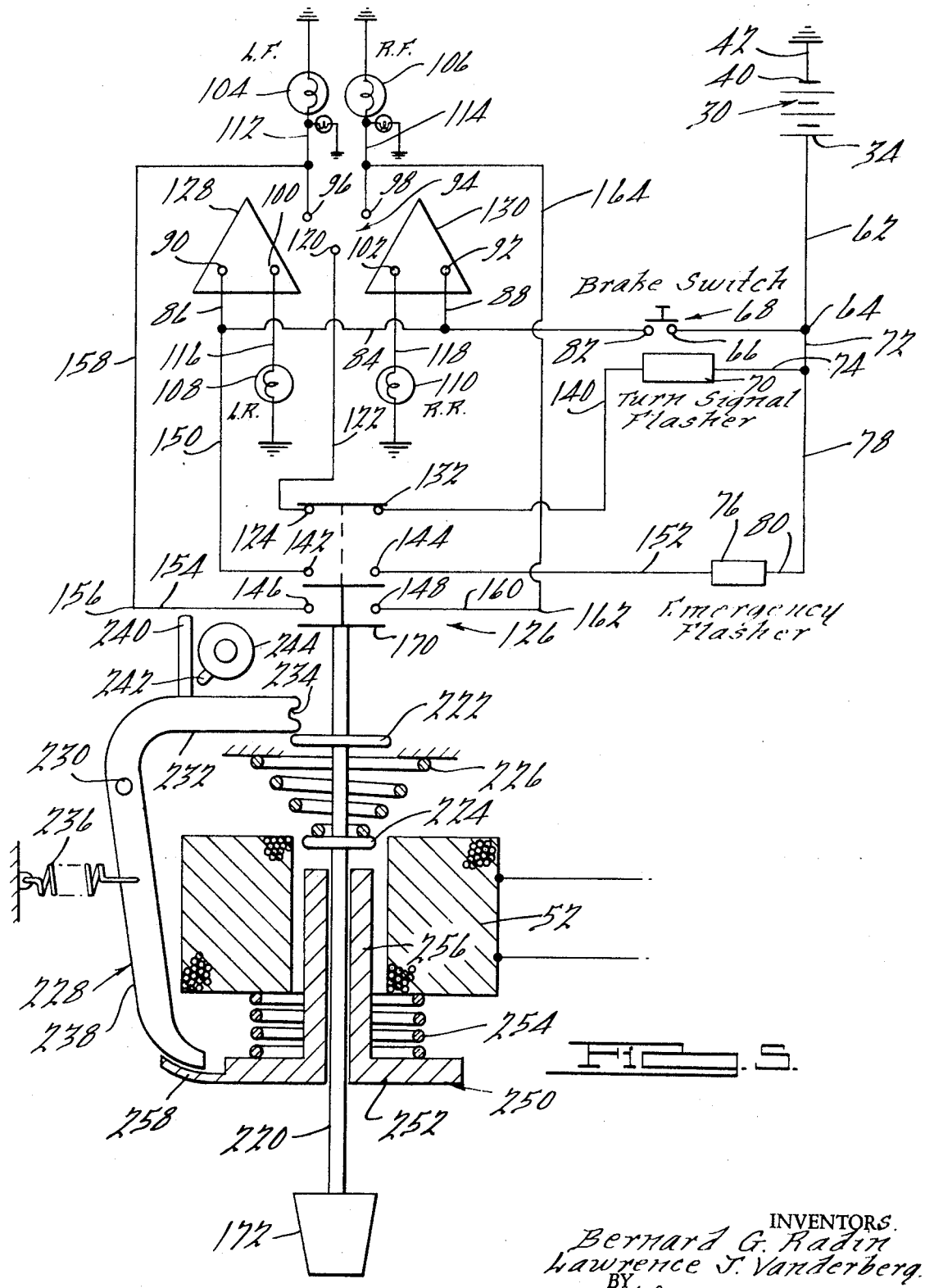

EXTERNAL HIGH SPEED WARNING SYSTEM FOR AN AUTOMOTIVE VEHICLE

This is a Continuation of application Ser. No. 103,212, filed Dec. 31, 1970, and now abandoned.

BACKGROUND OF THE INVENTION

This invention relates to an external high speed warning system for an automotive vehicle, and, more particularly, to such a system, in which the turn signal lamps of the vehicle will be energized intermittently when the automotive vehicle reaches a predetermined speed.

Modern day automotive vehicles have four turn signal lamps positioned at the four corners of the vehicle, which may be energized by a turn signal switch to indicate to observers external to the vehicle the driver's intentions of making either a left hand turn or a right hand turn. In addition, these four turn signal lamps may be energized simultaneously to provide an emergency warning system to observers external of the vehicle when the vehicle operator manually depresses an emergency warning switch, which is located on the steering column of the vehicle adjacent the turn signal switch. Means are provided for automatically returning the emergency warning switch to its off or inoperative position when the steering wheel of the vehicle is turned through a predetermined angular movement. In addition, a brake pedal operated switch is connected in circuit with the turn signal lamps and the turn indicator switch to energize at least the two rear turn signal lamps from the source of electrical energy at a steady or nonintermittent rate, when the brakes of the vehicle are applied.

The present invention makes use of the above described circuits and provides, in combination with them, a means for intermittently energizing all of the turn signal lamps when the speed of an automotive vehicle exceeds a predetermined limit, for example, a limit set within the range of 80 to 90 miles per hour. Additionally, an audible warning means may be provided which will be energized when the speed of the vehicle reaches this predetermined limit.

SUMMARY OF THE INVENTION

In the invention, a speed responsive switch is provided which is closed when the speed of the automotive vehicle reaches a predetermined limit. This speed limit may be some speed set in the range of from 80 to 90 miles per hour. The speed responsive switch may comprise a hairspring having one end anchored in the output shaft of a speedometer, which also has the speed indicator connected thereto. This end of the hairspring may comprise an arm which extends radially from the output shaft. A post may be mounted within the speedometer dial or face, and this post may be connected to the base of a solid state switching device.

When the predetermined speed limit is reached, this radially extending arm contacts the post to thereby switch the solid state switching device to a conducting state. A winding or solenoid is connected in circuit with the solid state switching device to be energized thereby from the electrical storage battery of the vehicle when the solid state switching device is switched to this conducting state. This solenoid or winding may be employed to actuate a relay having a pair of normally closed contacts and a pair of normally open contacts.

The turn signal switch of the automotive vehicle is adapted to be energized from a turn signal flashing switch through the normally closed contacts, and the normally open contacts are connected to the emergency flasher switch of the vehicle. When the relay winding or solenoid is energized, as a result of the closure of the speed responsive switch, the normally closed contacts are opened and the normally open contacts are closed. Upon closure of the normally open contacts, all four of the turn signal lamps of the automotive vehicle are energized from the source of electrical energy or storage battery of the vehicle through the emergency flasher switch and through unilateral conducting means that are poled to permit current flow from the emergency flasher switch to the turn signal lamps. In addition, an audible warning means may be connected to the normally open contacts to be energized when these normally open contacts are closed by the action described above.

In addition, means are provided for energizing all four turn signal lamps on a steady state basis when these normally open contacts are closed and when the brake pedal of the vehicle is depressed. This may be accomplished by employing a unilateral conducting means connected to the load side of a brake operated switch and poled to permit current flow from the electrical storage battery of the vehicle to the turn signal lamps through the closed brake switch, the unilateral conducting means, the closed contacts and the unilateral conducting means described in the above paragraph.

In another embodiment of the invention, the solenoid or winding described above, that is energized when the speed responsive switch is closed, may be employed to magnetically operate the emergency warning switch of the present invention. In this case, a solenoid armature is positioned in sliding or reciprocal relationship with respect to the shaft of the emergency warning switch. This solenoid armature acts to move the emergency warning switch into its closed position when the solenoid or winding is actuated or energized, and it also includes means for disabling the normal detent means associated with the shaft of the emergency warning switch.

An object of the present invention is the provision of an external high speed warning system for an automotive vehicle.

A further object of the present invention is the provision of an external high speed warning system for an automotive vehicle which is uncomplicated, reliable and uses a maximum number of components currently employed in present day automotive vehicles.

Other objects and attendant advantages of the present invention may be more readily realized when the specification is considered in connection with the attached drawings.

BRIEF DESCRIPTION OF THE DRAWINGS

FIG. 1 is a front elevational view of a conventional speedometer modified to provide a speed responsive switching means;

FIG. 2 is a partial side elevational view of the speedometer shown in FIG. 1;

FIG. 3 is a circuit diagram of a speed responsive switch of the present invention, which will energize a solenoid or winding via the mechanism shown in FIGS. 1 and 2;

FIG. 4 is a circuit diagram of one embodiment of the present invention; and 3,748,642

FIG. 5 is a circuit diagram and schematic of another embodiment of the present invention.

DESCRIPTION OF THE PREFERRED EMBODIMENT

Referring now to the drawings in which like reference numerals designate like parts throughout the several views thereof, there is shown in FIGS. 1 and 2 a conventional speedometer 10 having an indicator dial 11 and a pointer 12 driven by a conventional eddy current cup device. The output shaft 13 to which the pointer 12 is attached has a hairspring 14 attached thereto, and this attachment may be accomplished by passing a straight portion 16 of the hairspring 14 through a bore 18 in the speedometer output shaft 13 at an angle substantially perpendicular to the longitudinal axis of the speedometer shaft. The other end 21 of the hairspring 14 is anchored with respect to the indicator dial 11 by anchoring it in a slot 23 in a pin 25 that is affixed to the indicator dial 11. The straight portion 16 of the hairspring 14 is adapted to engage a pin 27 that is affixed to the indicator dial to thereby close an electrical circuit which is described in greater detail below. For this purpose, the pin 27 is positioned radially outwardly of the speedometer output shaft 13, and this pin is shorter in axial length than the axial distance between the indicator dial 11 and the pointer 12. This pin 27 is positioned in the speedometer dial 11 so that the straight portion 16 of the hairspring 14 will engage it when the speed of the automotive vehicle reaches some predetermined speed in the range of 80 to 90 miles per hour. For example, as shown on the drawing, the pin 27 is positioned so that the straight portion 16 of the spring 14 will engage it when the speed of the vehicle reaches 85 miles per hour.

Referring now to FIG. 3, there is shown a circuit diagram of a circuit that will be energized when the speed of the vehicle reaches 85 miles per hour, and the straight portion 16 of the hairspring 14 comes into engagement with the pin 27. This circuit comprises a source of electrical energy in the form of a storage battery 30 of the motor vehicle in which the mechanism of the present invention is mounted. The storage battery 30 has a positive terminal 34 connected through lead 36 to a lead 38 and a negative terminal 40 connected to ground through a lead 42.

A transistor 44 of the NPN type has an emitter electrode 46 connected through lead 48 to the lead 38. A collector electrode 50 connected to one terminal of a winding or solenoid 52. The other terminal of the winding or solenoid 52 is connected to ground through a lead 54. The base electrode 58 of transistor 44 is connected through a resistor 60, i.e., a current limiting resistor, to the pin 27.

It may be readily appreciated that in the operation of the circuit shown in FIG. 3, the transistor 44 will be in its nonconducting state when the straight portion 16 of the hairspring 14 is out of contact with the pin 27, since no base current can flow out of the base 58. When the straight portion 16 of the hairspring 14, however, comes into contact with the pin 27, a current path is provided from the base 58 to ground through the pin 27, the straight portion 16, the main body and the end 21 of the hairspring 14 and the pin 25. As a result, when the straight portion 16 of the hairspring 14 comes into contact with the pin 27, the transistor 44 is switched to its conducting state, thereby energizing the solenoid or winding 52. As previously stated, the pin 27 is positioned, as an example, at the 85 miler per hour mark on the indicator dial 11, so that when this speed is reached, the transistor is switched to its conducting state and the solenoid or winding 52 is energized. It is, of course, obvious that the pin 27 may be positioned at other positions on the indicator dial 11, so that the transistor is switched to a conducting state at speeds other than the 85 miles per hour speed illustrated in FIG. 1.

Referring now to FIG. 4, the source of electrical energy in the form of the storage battery 30 has the positive terminal 34 thereof connected to a lead 62. The lead 62, in turn, is connected to a junction 64, and the junction 64 is connected to a stationary contact 66 of a normally open brake operated switch 68 that is closed when the brakes of the automotive vehicle are applied. The junction 64 is also connected to one terminal of a first or turn signal flasher switch 70 through leads 72 and 74 and to one terminal of a second or emergency flasher switch 76 through leads 72, 78, and 80. The other stationary contact 82 of the brake operated switch 68 is connected through lead 84 and leads 86 and 88, respectively, to stationary contacts 90 and 92 of a turn signal switch generally designated by the numeral 94. This turn signal switch also comprises four other stationary contacts 96, 98, 100, and 102, which are connected respectively to turn signal lamps 104, 106, 108, and 110 through leads 112, 114, 116, and 118, respectively. The turn signal switch 94 also includes another stationary contact 120, which is connected through lead 122 to a stationary terminal 124 of an emergency warning switch generally designated by the numeral 126. The turn signal switch 94 also includes a pair of moveable contacts 128 and 130.

A stationary contact 132 of the emergency warning switch 126 opposite stationary contact 124 is connected through lead 134, a pair of normally closed contacts 136 of a relay 138, and lead 140 to the first or turn signal flasher switch 70. The winding for operating the relay 138 is the solenoid or winding shown in FIG. 3. The emergency warning switch 126 also includes four other stationary contacts 142, 144, 146, and 148. Stationary contact 142 is connected through lead 150, lead 84, leads 86 and 88, with stationary contacts 90 and 92 of turn signal switch 94. The opposed stationary contact 144 is connected through lead 152 to the second or emergency flasher switch 76. Stationary contact 146 is connected through lead 154, junction 156, and lead 158 to lead 112 and, hence, the left front turn signal lamp 104. The opposed stationary contact 148 is connected through lead 160, junction 162, and lead 164 to lead 114 and, hence, the right front turn signal lamp 106.

The emergency warning switch 126 also includes three bridging contacts 166, 168, and 170, which are operated in unison by the movement of knob 172. As shown, the bridging contact 166 normally bridges stationary contacts 124 and 132. Bridging contact 168 is positioned to bridge stationary contacts 142 and 144, and bridging contact 170 is positioned to bridge stationary contacts 146 and 148 when the knob 172 is moved upwardly as shown in FIG. 4. Additionally, a conducting bar 174 is connected between bridging contact 168 and bridging contact 170.

The relay 138 also includes a normally open pair of contacts 176, in which the stationary contact 178 is connected through lead 180 to the second or emergency flasher switch 76, and in which the moveable contact 182 is connected through lead 184 to a line 186. The line 186, in turn, is connected through unilateral conducting means or diode 190 to junction 156 and, hence, to the left front turn signal lamp 104 through leads 158 and 112. Another unilateral conducting means or diode 192 connects line 186 to the left rear turn signal lamp 108 via lead 193 and lead 116. The right rear turn signal lamp 110 is connected to line 186 through unilateral conducting means or diode 194 and lead 196, and the right front turn signal lamp 106 is connected to line 186 through unilateral conducting means or diode 198 and lead 164.

A buzzer generally designated by the numeral 202 may also be connected to line 186. This buzzer 202 may comprise a winding 204 and a set of contacts 206 connected in series, so that when the winding 204 is energized, the contacts 206 will cyclically open and close to provide an audible warning to the vehicle operator for purposes to be described subsequently.

In addition, the stationary contact 82 of the brake switch 68 is connected through lead 84, lead 210, unilateral conducting means or diode 212, and lead 214 to the lead 152 and, hence, to the lead 180 connected to the stationary contact 178 of the normally open contacts 176 of relay 138, and to the stationary contact 144 of the emergency warning switch 126.

FIG. 5 shows another embodiment of the invention in which the solenoid or winding 52 shown in FIG. 3 is employed to move the emergency flasher switch 126 to its closed position. Consequently, when the speed of the automotive vehicle with which this invention is associated reaches the predetermined limit described above, i.e., in the range of from 80 to 90 miles per hour, and, more specifically, as shown in FIG. 1, 85 miles per hour, all four turn signal lamps 104, 106, 108, and 110 are flashed on an intermittent basis. To accomplish this, the solenoid or winding 52 is positioned about the operating shaft 220 of the emergency warning switch 126. The shaft 220 has a pair of axially spaced radially extending flanges 222 and 224, and a compression spring 226 engages the flanges 224 to bias the shaft 220 downwardly, as shown in FIG. 5, and the emergency warning switch 126 to the off position, as shown in FIG. 5. The other flange 222 is designed to cooperate with an L-shaped detent 228, which is pivotally mounted at 230. This L-shaped detent 228 has an inwardly extending arm 232, having a slot or groove 234 positioned therein for the reception of the radially extending flange 222 on the shaft 220. Additionally, a tension spring 236 is connected to the other arm 238 of the L-shaped detent 228 to bias the arm 232 inwardly, as shown in FIG. 5. The arm 232 has an upstanding tab 240 located thereon which is adapted to be engaged by a cam 242 located on the steering wheel shaft 244.

Thus, when the knob 172 is moved inwardly, as shown in FIG. 5, to close the emergency warning switch 126, the radially extending flange 222 will move into the slot or groove 234, and the emergency warning switch will be held in the closed position by the detent 228. The emergency warning switch may be opened by manually moving the knob 172 downwardly, as shown in FIG. 5, or by the rotation of the steering shaft 244, which will cause the cam 242 to engage the tab 240 and move the arm 232 of L-shaped detent 228 radially outwardly, as shown in FIG. 5.

A solenoid armature 250 is positioned in slidable relationship about the shaft 220, and it has a radially outwardly extending portion 252, which is biased into the position shown in FIG. 5 by a compression spring 254. This solenoid armature 250, in addition, has an axially extending portion 256 positioned inside the solenoid 52 and in a position to engage the radially extending flange 224 on the shaft 220 of the emergency warning switch 126. A radially extending tab or arm 258 is positioned to engage the arm 238 of detent 228 when the solenoid armature 250 is moved upwardly, as shown in FIG. 5. Thus, when the solenoid or winding 52, as shown in FIGS. 3 and 5, is energized as a result of the speed of the automotive vehicle reaching the predetermined limit mentioned above, i.e., 85 miles per hour, the solenoid armature 250 moves upwardly, thereby closing the emergency warning switch 126 by virtue of the axially extending portion 256 engaging the radially extending flange 224. In addition, the arm 258 acts on the arm 238 of L-shaped detent 228 to move arm 232 thereof radially outwardly so that the slot or groove 234 positioned therein will be moved to a position where it cannot engage and trap the radially extending flange 222. As a result of this action, the detent 228 is disabled when the solenoid or winding 52 is energized. Consequently, when solenoid winding 52 is de-energized, the emergency warning switch will automatically be moved to its open position under the impetus of compression spring 226.

OPERATION

In the operation of both the embodiments shown in FIGS. 4 and 5, if the vehicle operator wishes to signal his intention to complete a left hand turn, he will move the turn signal switch 94 so that the moveable contact 128 comes into ngagement with the fixed contacts 96 and 120. This action energizes the left front turn signal lamp 104 and the left rear turn signal lamp 106 from the source of electrical energy 30 through the first or turn signal flashing switch 70, the fixed contacts 132 and 124 and bridging contact 166 of the emergency warning switch 126, lead 122, fixed contact 120, and moveable contact 128. In addition, with respect to FIG. 4, this circuit path includes the normally closed contacts 136 of relay 138. On the other hand, if the vehicle operator wishes to indicate his intention to make a right hand turn, the moveable contact 130 is moved into engagement with fixed contacts 98 and 120 to thereby energize the right front turn signal lamp 106 and the right rear turn signal lamp 110 through the circuit previously described and including moveable contact 130.

The vehicle operator may, as an emergency warning measure, move the emergency warning switch 126 to its operative or on position by moving the knob 172 upwardly as shown in FIGS. 4 and 5. This action disconnects the stationary contact 124 from the stationary contact 132, and connects stationary contact 142 with stationary contact 144 and connects stationary contact 146 with stationary contact 148 by bringing the bridging contacts 168 and 170 into engagement with opposed contacts 142 and 144 and opposed contacts 146 and 148, respectively. Consequently, the four turn signal lamps 104, 106, 108, and 110 are energized from the source of electrical energy 30 through the second or emergency flasher switch 76. This energizing circuit includes lead 152 from the second or emergency flahser switch 76, stationary contact 144, bridging contact 168, and stationary contact 142 of the emergency warning switch 126. From the stationary contact 142 electrical energy is fed via lead 150, lead 86, stationary contact 90, moveable contact 128 and stationary contact 100 of turn signal switch 94, and lead 116 to the left rear turn signal lamp 108. On the other hand, electrical energy is fed from stationary contact 142, via lead 150, lead 84, lead 88, stationary contacts 92 and 102, and moveable contact 130 of turn signal switch 94 and lead 118 to the right rear turn signal lamp 110.

Electrical energy also is fed to the left front turn signal lamp 104 from the second or emergency flasher switch 76 via lead 152, stationary contact 144, bridging contact 168, conducting bar 174, bridging contact 170 and stationary contact 146 of the emergency warning switch 126, lead 154, junction 156, lead 158, and lead 112. Similarly, current is fed from the second or emergency flasher switch 76 to the right front turn signal lamp 106 via the circuit path described above, but instead of being fed from the stationary contact 146 of the emergency warning switch 126, the right front turn signal lamp 106 is fed from the stationary contact 148 of emergency warning switch 126 via lead 160, junction 162, lead 164, and lead 114.

In both the embodiments shown in FIGS. 4 and 5, when the moveable contacts 128 and 130 are in the open position, as shown on the drawings, the left rear turn signal lamp 108 and the right rear turn signal lamp 110 may be energized directly from the source of electrical energy 30 when the brake operated switch 68 is closed. This is accomplished through the two stationary contacts 66 and 82 of the brake operated switch 68, lead 84, lead 86, stationary contact 90, moveable contact 128, stationary contact 100, and lead 116 to the left rear turn signal lamp 108 and from lead 84 through lead 88, stationary contact 92, moveable contact 130, stationary contact 102, and lead 118 to the right rear turn signal lamp 110. Also, if either the moveable contact 128 or the moveable contact 130 is moved to energize the left front turn signal lamp 104 and the left rear turn signal lamp 108 from the first or turn signal flasher switch 70, or to energize the right front turn signal lamp 106 and the right rear turn signal lamp 110 from the first or turn signal flasher switch 70, actuation of the brake operated switch 68 will act to short out the first or turn signal flasher switch 70 and to energize these lamps on a steady state basis when the brakes of the vehicle are applied.

In addition, if the emergency warning switch 126 is in its operative or on condition and the brake operated switch 68 is actuated, the second or emergency flasher switch 76 will be shorted out of the circuit and all of the turn signal lamps 104, 106, 108, and 110 will be energized on a steady state basis from the source of electrical energy 30. In the embodiment shown in FIG. 4, the left rear turn signal lamp 108 and the right rear turn signal lamp 110 are energized from the source of electrical energy 30 through the closed brake operated switch 68, via lead 84, lead 86, stationary contact 90, moveable contact 128, stationary contact 100, and lead 116 to the left rear turn signal lamp 108 and from lead 84 through lead 88, stationary contact 92, moveable contact 130, stationary contact 102 and lead 118 to the right rear turn signal lamp 110. With respect to FIG. 4, with the emergency flasher switch 126 in its closed condition, the bridging contact 168 will be coupled to the source of electrical energy 30 through the closed brake operated switch 68. lead 210, unilateral conducting means or diode 212, lead 214, and lead 152. This, in turn, energizes stationary contacts 146 and 148 on a steady state basis and the left front turn signal lamp 104 is energized from stationary contact 146 via lead 154, junction 156, lead 158, and lead 112. The right front turn signal lamp 106, on the other hand, is energized from stationary contact 148 via lead 160, junction 162, lead 164 and lead 114.

If the speed of the automotive vehicle incorporating the present invention reaches the predetermined speed limit described above, i.e., 85 miles per hour, the transistor 44 will be switched to a conducting state since the straight portion 16 of hairspring 14 will come into contact with the pin 27, thereby providing a path for current out of base 58 of transistor 44. As a result, the solenoid or winding 52 will be energized. With respect to the embodiment shown in FIG. 4, the energization of the winding 52 will close normally open contacts 176 and open normally closed contacts 136. The closing of the normally open contacts 176 will connect line 186 to the load side of the second or emergency flasher switch 76, thereby energizing line 186 from the source of electrical energy 30 through the second or emergency flasher switch 76 at an intermittent rate. The buzzer 202, including winding 204 and contacts 206, will, therefore, be energized at an intermittent rate from the line 186. Similarly, the left front turn signal lamp 104 will be energized at an intermittent rate from line 186 through unilateral conducting means or diode 190, junction 156, lead 158, and lead 112. The right front turn signal lamp will also be energized at an intermittent rate from line 186 via unilateral conducting means or diode 198, junction 162, lead 164, and lead 114. The left rear turn signal lamp 108 will be energized from line 186 at an intermittent rate via unilateral conducting means or diode 192, lead 193, and lead 116, and the right rear turn signal lamp 110 will be energized at an intermittent rate from the line 186 via unilateral conducting means or diode 194, lead 196, and lead 118. The unilateral conducting means or diodes 190, 192, 194, and 198 provide a means for isolating the turn signal lamps 104, 106, 108 and 110 from another during the other operations of the system, i.e., turn indicating operations and braking operations.

If the vehicle operator applies the brakes of the vehicle while the vehicle is exceeding the predetermined speed limit stated above, and the system is energized as described above, the emergency or second flasher switch 76 will be shorted out of the circuit and the line 186 will be energized at a steady rate through the brake operated switch 68, lead 210, unilateral conducting means 212, lead 214, lead 152, lead 180, closed contacts 176 and lead 184. This action, therefore, will energize all of the turn signal lamps 104, 106, 108, and 110 at a steady state or non-intermittent condition. Similarly, the buzzer 202 will be energized at a steady rate from the source of electrical energy 30 via line 186, thereby causing the buzzer 202 to sound at a steady rate.

When the speed of the vehicle falls below the predetermined speed limit, so that the straight portion 16 of hairspring 14 comes out of contact with pin 27, transistor 44 will be switched to a nonconducting state and winding 52 will be de-energized. This opens the closed contacts 176 and closes contacts 136 thereby returning the system to a normal state. It is apparent from the description above that if the predetermined speed limit should be exceeded while the vehicle operator is signaling a turn, the turn signal flasher switch 70 will be disabled since the normally closed contacts 136 of relay 138 are opened, as previously described by the energization of the winding 52 when the predetermined speed limit is exceeded.

As previously described, with respect to FIG. 5, when the solenoid or winding 52 is energized, as a result of the vehicle operating at a speed in excess of the predetermined speed limit, the emergency warning switch 126 is closed to thereby energize all four turn signal lamps 104, 106, 108, and 110 from the source of electrical energy 30 through the second or emergency flasher switch 76. Simultaneously, the arm or tab 258 on armature 250 pivots the L-shaped detent 228 so that the groove or slot 234 in arm 232 cannot engage or trap the radially extending flange 222, to thereby hold the emergency warning switch in the closed position.

With respect to FIG. 5, the turn signal lamps 104, 106, 108 and 110 will be energized at a steady or nonintermittent rate directly from the source of electrical energy 30 through the brake operated switch 68, should the vehicle operator apply the brakes of the vehicle when the speed of the vehicle is in excess of this predetermined limit. This is accomplished by energizing the left rear turn signal lamp 108 and the right rear turn signal lamp 110 through lead 84, lead 86, stationary contact 90, moveable contact 128, stationary contact 100, and lead 116 for left rear turn signal lamp 108 and through lead 88, stationary contact 92, moveable contact 130, stationary contact 102, and lead 118 for the right rear turn signal lamp 110. In addition, with the emergency warning switch 126 closed as it is when vehicle is operating at a speed in excess of the predetermined limit, the stationary contact 142 of the emergency warning switch 126 will be energized from the closed brake operated switch 68 via lead 84 and lead 150. This, in turn, will energize stationary contacts 146 and 148 via bridging contact 168, conducting bar 174 and bridging contact 170. The left front turn signal lamp 104 will, therefore, be energized at a steady state condition from contact 146 via lead 154, junction 156, lead 158 and lead 112, and the right front turn signal lamp 106 will similarly be energized at a steady state condition or rate from contact 148 via lead 160, junction 162, lead 164 and lead 114.

An audible warning means may also be provided with the embodiment of the invention shown in FIG. 5. For example, a buzzer or other audible warning means may be connected in series with the source of electrical energy or stroage battery 30 through a pair of normally open contacts. Means may be positioned to be moved by the solenoid armature 250 to close these contacts when the solenoid armature is moved as a result of the speed of the vehicle exceeding the above mentioned predetermined speed limit.

Although a pair of normally open contacts, straight portion 16 of hairspring 14 and pin 27, is employed to energize winding or solenoid 52 through transistor 44, when the speed of the vehicle exceeds a predetermined speed limit, it can be readily realized that a pair of normally closed contacts could be employed for this purpose. For example, a normally closed relay could be employed with the relay connected in series with the solenoids or windings shown in FIGS. 4 and 5. The normally closed contacts could be used to maintain the transistor shown in FIG. 3 in a normally conducting state thereby normally energizing the winding shown in this Figure. This winding would be employed to open the normally closed relay. When the speed of the vehicle exceeds the predetermined limit, the transistor would be switched to a nonconducting state thereby de-energizing the winding of the normally closed relay. This action would close the normally closed relay and energize the windings or solenoids shown in FIGS. 4 and 5 from the source of electrical energy.

The present invention thus provides an external high-speed warning system for an automotive vehicle which will intermittently flash or energize all four turn signal lamps of the vehicle when a predetermined speed limit has been exceeded. This speed limit may be in the range of 80 to 90 miles per hour and may be set as shown in the drawings at 85 miles per hour. The present invention accomplishes this by utilizing a maxinum number of components and parts currently employed in modern day vehicles. In addition, means may be provided with this system to provide an audible warning to the vehicle driver or operator that he has exceeded this predetermined speed limit.

We claim:

1. In an automotive vehicle, a source of electrical energy, four turn signal lamps positioned on the vehicle, a first flashing switch including means for cyclically closing said flashing switch when current flows therethrough, turn signal switch means for energizing either the left hand two turn signal lamps when said turn signal switch means is actuated in one direction or for energizing the right hand two turn signal switches when the turn signal switch means is actuated in the other direction, a second flashing switch coupled to said source of electrical energy, manually operable means for energizing all four of said turn signal lamps from said source of electrical energy through said second flashing switch when said manually operable means is moved from a first position to a second position, and means responsive to the speed of the automotive vehicle for energizing all four turn signal lamps from said source of electrical energy through said second flashing switch when the speed of the automotive vehicle reaches a predetermined speed, said means responsive to the speed of the vehicle including a relay having a pair of normally closed contacts, a pair of normally open contacts and a winding means for opening said normally closed contacts and for closing said normally open contacts when energized, said normally closed contacts being connected in series with said first flashing switch and said turn signal switch and said normally open contacts being connected in series with said second flashing switch and said four turn signal lamps, and means for energizing said warning from said source of electrical energy when the speed of the automotive vehicle reaches said predetermined speed.

2. The combination of claim 1 and further comprising unilateral conducting means connected in series with said normally open switch and each of said turn signal lamps and poled to permit current flow from said normally open switch to said turn signal lamps.

3. The combination of claim 2 and further comprising a brake pedal actuated switch means coupled to said source of electrical energy to said turn indicator switch and to said second flashing switch for energizing said turn indicator lamp directly from said source of electrical energy and by-passing said second flashing switch when said brake pedal actuated switch means is actuated.

* * * * *